United States Patent [19]

Kornylak

[11] 4,422,988
[45] * Dec. 27, 1983

[54] FLUID FILM CONTINUOUS PROCESSING METHOD AND APPARATUS

[75] Inventor: Andrew T. Kornylak, Hamilton, Ohio

[73] Assignee: Kornylak Corporation, Hamilton, Ohio

[*] Notice: The portion of the term of this patent subsequent to Jul. 14, 1998, has been disclaimed.

[21] Appl. No.: 282,510

[22] Filed: Jul. 13, 1981

Related U.S. Application Data

[63] Continuation-in-part of Ser. No. 954,448, Oct. 25, 1978, Pat. No. 4,278,624.

[51] Int. Cl.³ .............................................. B29D 27/04
[52] U.S. Cl. .................................. 264/40.3; 264/40.6; 264/45.8; 264/46.5; 264/51; 264/83; 264/216; 425/115; 425/144; 425/145; 425/145; 425/224; 425/817 C
[58] Field of Search ..................... 264/40.1, 46.5, 45.8, 264/40.3, 40.6, 51, 83, 216; 425/115, 144, 145, 224, 817 C

[56] References Cited

U.S. PATENT DOCUMENTS 3,914,357 10/1975 Cereijo et al. ..................... 264/40.2
4,278,624 7/1981 Kornylak ........................ 264/40.3 X Primary Examiner—Philip E. Anderson
Attorney, Agent, or Firm—Thomas E. Beall, Jr.

[57] ABSTRACT

An apparatus and a method is disclosed for continuously producing an indefinite length strip of material in a mold with monitoring of such operating characteristics as product temperature, product pressure, product quantity, film temperature, film pressure, film quantity, reaction time, processing time, product through speed, and the like, together with comparing such monitored values with "profiles" of the desired characteristics to provide for close and quick control of such characteristics. The profile is a comparison standard for each characteristic and defined as a fixed curve representing the desired change of such characteristic with respect to another characteristic, for example, the desired variable temperature along the length of a molding apparatus. Most preferably, foam products are produced.

7 Claims, 11 Drawing Figures

FLUID FILM CONTINUOUS PROCESSING METHOD AND APPARATUS

RELATED APPLICATION

The present application is a continuation-in-part application of the application of Andrew T. Kornylak, Ser. No. 954,448, filed Oct. 25, 1978, now U.S. Pat. No. 4,278,624 issued July 14, 1981, entitled "Fluid Film Continuous Processing Method and Apparatus".

BACKGROUND OF THE INVENTION

In the processing of continuous indefinite length strip like material, in a mold, there are a number of variables to be monitored and controlled. The efficiency of operation and quality of product are greatly affected by such control, and the initial cost and later upkeep of machinery is further affected by such control.

SUMMARY

It is an object of the present invention to efficiently produce high quality continuous length or indefinite length products in a molding apparatus of minimum initial cost and subsequent upkeep.

The apparatus and method disclosed in the aforementioned patent of the present inventor can be most efficiently run, produced, maintained and operated with high product quality through close and fast control of various operating characteristics, such as product temperature, product pressure, product quantity, film temperature, film pressure, film quantity, reaction time, processing time, product through speed, and the like.

The above objects are primarily accomplished through monitoring of such characteristics, comparing monitored values with "profiles" of the desired characteristics, and close control in a quick manner of such characteristics. It is known to compare a test characteristic with a standard characteristic and thereby produce a deviation signal to be used in a feedback control of such characteristic, in general. Instead of employing a fixed reference characteristic, the present invention employs a profile of such characteristics, which is defined as a fixed curve representing the desired change of such characteristic with respect to another characteristic, for example the desired variable temperature along the length of a molding apparatus. The present invention is particularly applicable to the continuous formation of strip foam products.

BRIEF DESCRIPTION OF THE DRAWINGS

Further objects, features and advantages of the present invention will become more clear from the following detailed description of a preferred embodiment, specifically shown in the drawing, wherein.

DETAILED DESCRIPTION

Figure 1:
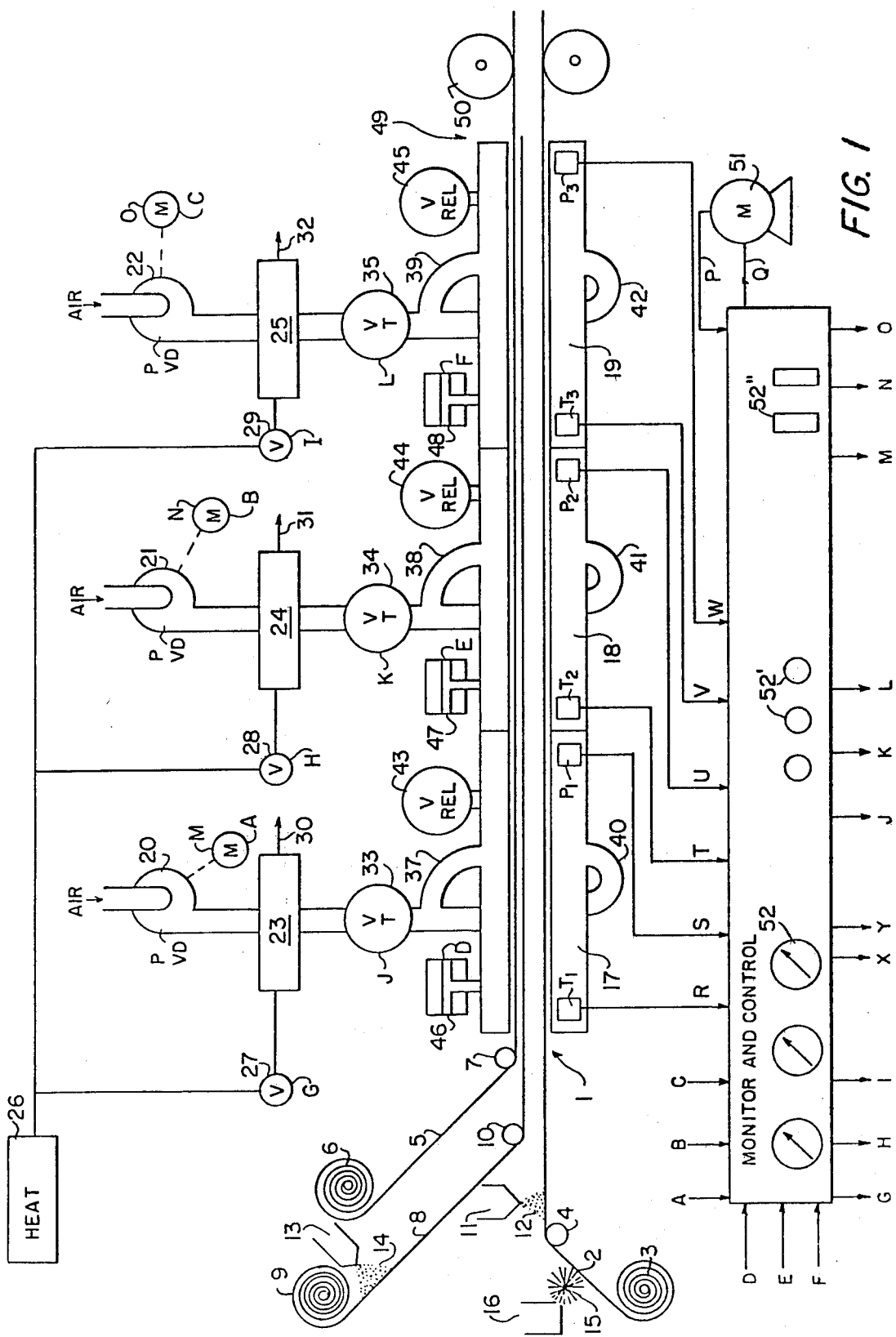
FIG. 1 is a schematic side elevation view of apparatus employing features and operating according to the method of the present invention.

For the apparatus shown in FIG. 1, a product laminated of outer and central webs of sheet material, such as paper or thin film synthetic resin, and rigid synthetic resin, such as polyurethane, is continuously formed and cured. At the entrance end 1 of the apparatus, web material forming the lower laminate 2 is fed from a supply coil 3 and guided by roll 4 into the entrance end 1, an outer upper laminate 5 of web material is fed from a coil supply 6 around a guide roller 7 and into the entrance end 1 of the apparatus, and a central laminate of web material 8 is fed from a coil supply of such material 9 around the guide roll 10 between the upper laminate 5 and lower laminate 2 into the apparatus entrance end 1.

A conventional mixing head and nozzle 11 is employed to lay down a mixture of foamable chemicals 12 on the upper surface of the laminate 2, and a similar mixing head and nozzle 13 will lay down the same or different mixture of foamable chemicals 14 on the upper surface of the central laminate 8. By way of example, these foamable chemicals may be such that they will foam, when mixed, and cure (accelerated by heat) to produce polyurethane foam type expanded resin. Prior to passing the guide roll 4, a brush 15 receives adhesive from a supply 16 and spreads the adhesive on the two opposite marginal edges of the laminate 2, so that at the entrance end 1 of the apparatus, pinch rollers (shown in FIG. 2) provided at each marginal edge will squeeze the lower laminate 2 and the upper laminate 5 together at their marginal edges (with central laminate 8 being of less width than the lower laminate 2 and upper laminate 5), so as to close the marginal edge of the laminates and form a partitioned continuous bag at the entrance end 1 of the molding apparatus with foamable chemicals inside.

The conveying portion of the apparatus is divided into a plurality of sections, with three sections being specifically shown for purposes of illustration, such sections being a first section 17 wherein the foamable resin rises and attains its final height, a second section 18 wherein the foamable resin exerts a considerable amount of pressure on the apparatus (for example 3–5 psi), and a final curing section 19, where the foamed material is at least partially cured. Additional sections may be provided for greater control. These sections 17, 18, and 19 are constructed of opposed rigidly supported plenum chambers, which are generally rectangular in configuration and abut each other so as to form an upper mold planar support surface and a correspondingly-shaped lower mold planar support surface, each having the length as shown and a width so as to extend for at least the full width of the bag 2, 5 formed at the entrance end 1 of the apparatus.

Each of these plenums is porous or has a pattern of holes or nozzles in its surface facing the bag 2, 5 that will direct compressed air from within the plenum outwardly against the upper laminate 5 and lower laminate 2 so as to form respective air bearings for the bag 2, moving through the apparatus continuously from left to right in FIG. 1. For each one of the sections 17, 18, 19, air is compressed in pumps 20, 21, 22, respectively.

Figure 5:
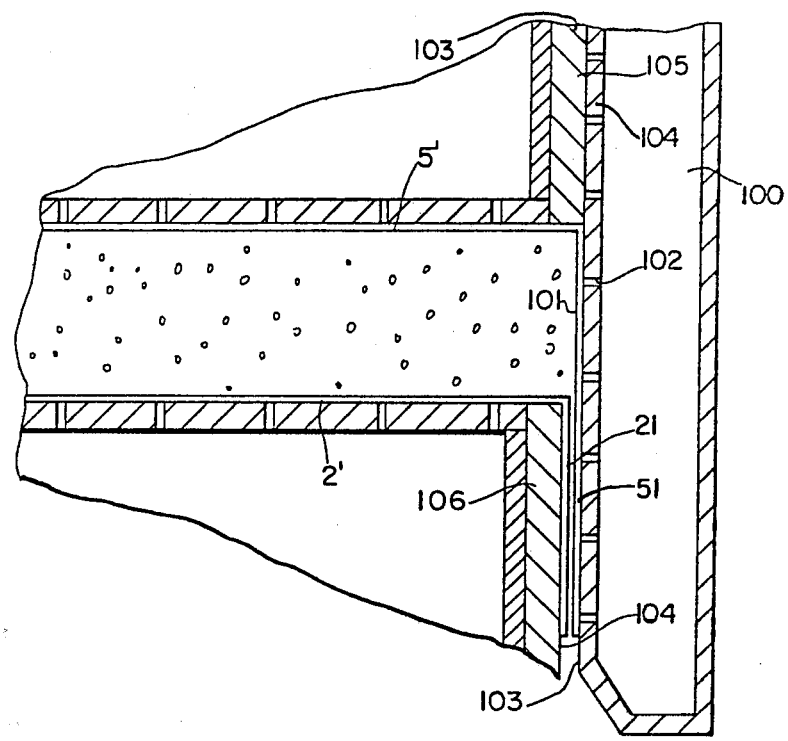
FIG. 5 is a partial cross-sectional view similar to FIG. 4, but of a further embodiment for the side closure of the mold.

Instead of separate pumps 20, 21, 22, a single pump may be employed, for example an eight-stage compressor having a capacity of 2 cubic feet per minute at a temperature of 180° F. may be employed and driven by a 100 horsepower motor. Thus a single compressor could provide the needed air for all of the plenums as shown in FIG. 5.

Whether a separate compressor is provided for each of the plenums, or whether a single compressor is provided so that its output is divided into branches for the respective plenums, each of the plenums is provided with a heat exchanger 23, 24, 25, respectively, each of which, if needed, will cool or further heat the air being fed to its respective plenum, independently of the other heat exchangers and be controlled so as to produce a selected temperature within the respective plenums. This controlled heat exchange is provided by a source 26 of heated or refrigerated fluid that is individually fed to the entrance of each of the heat exchangers 23, 24, 25, under the control of corresponding adjustable throttle valves 27, 28, 29 that will individually control the flow of heat exchange fluid. After passing through the heat exchanger, the heat exchange fluid will exit at 30, 31, 32, respectively to a sump for the heat exchange fluid or be discharged to the environment. The throttle valves 27, 28, 29 are each individually controlled by a solenoid or other electric motor that will infinitely or stepwise adjust such valves as controlled by an electric signal fed at G, H & I into the respective control electric lines for valves 27, 28, 29. Thus the temperature of the air fed to the plenums is adjustable.

The high pressure air that exits from the separate heat exchangers then passes through respective air throttle valves 33, 34, 35 where the pressure of the air being supplied to the plenums 17, 18, 19 is individually controlled with a stepwise or infinite adjustment, each under the independent control of an electric motor (built into the valve) operated by electrical signals J, K, L through the indicated control lines, respectively. Thus the pressure of the air fed to the plenums is controllable.

Figure 6:
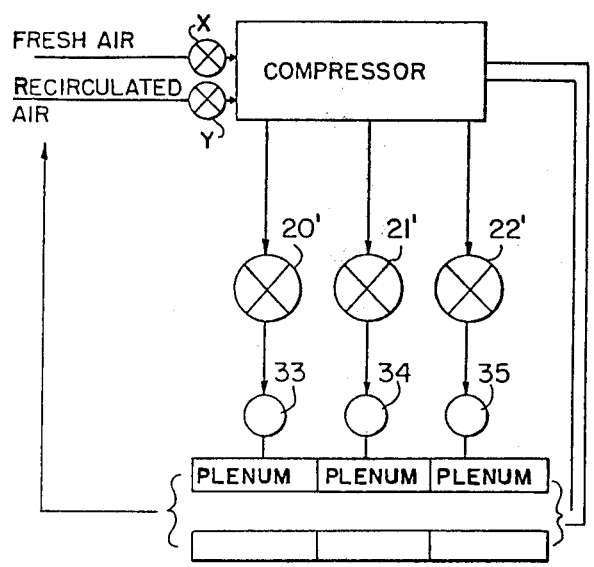
FIG. 6 is a schematic illustration of a portion of FIG. 1 showing a variation in the construction of FIG. 1.

The volume flow of air being fed to the plenums 17, 18, 19 is regulated by electrical signals M, N, O that are respectively fed to the electric motors driving the pumps or compressors 20, 21, 22 respectively so as to control the speed of such motors. Of course, if only a single compressor was employed as in FIG. 6 then such motors would operate flow control valves 20',21',22'. Suitable sensors, such as motor current sensors, will determine the speed of each of the motors and provide feedback speed signals A, B, and C which will be indicative of the motor speed and correlated to the volume flow of compressed air to the plenums respectively.

Each of the plenums 17. 18, 19 is divided into an upper plenum and a lower plenum, with the air being delivered from the respective throttle valves 33, 34, 35 being divided by branch lines 37, 38, 39 that feed to the upper plenums, respectively and branch lines 40, 41, 42 that feed to the lower plenums respectively. Pressure relief valves 43, 44, 45 are respectively provided for the plenums to relieve any over pressure as a safety measure.

The lower plenums are fixedly supported, whereas the upper plenums are movable between a lower molding position at a fixed distance from the lower plenum, for example, one inch to an upper repair position where they are greatly spaced from the lower plenum, for example, one foot, or to intermediate positions for different height products. The upper plenums are moved between such positions by hydraulic or pneumatic cylinders 46, 47, 48. Each of the cylinders 46, 47, 48 is provided with pressurized fluid as indicated, although they could be double acting cylinders for raising and clamping pressure. The pressure within such cylinders is monitored so as to produce pressure signals D, E, F respectively for each of the cylinders 46, 47, 48, which pressure signals will be correlated to the pressure of the foam resin in the respective mold sections between the plenums.

After complete curing or at least partial curing, the foam resin product leaves the exit end 49 of the molding apparatus, where it passes drive rolls 50 which are driven by means of a motor 51. The drive rolls may provide the sole motive force for pulling the product through the molding apparatus. If desired, the product leaving the molding apparatus may be partially cured and the drive rolls configured to as to provide a three dimensional texture to the surface of the product. Electrical signal Q controls the speed of the motor 51, whereas electrical signal P provides a speed feedback signal, all in a conventional manner for motor controls.

Within the plenum 17, there is a temperature sensor T1 and a pressure sensor P1, which produce and feed respective electrical signals R and S; within the plenum 18, there is a temperature sensor T2 and a pressure sensor P2, respectively producing and feeding correlated electrical signals T and U; and in the plenum 19, there is a temperature sensor T3 and a pressure sensor P3, which respectively produce and feed correlated electrical signal V and W. All of the electrical signals A through W are either fed through or eminate from a central monitor and control. The central monitor and control is composed of conventional components per se, and may include one or more gauges or readouts 52, or warning lights 52', or switches 52".

Figure 2:
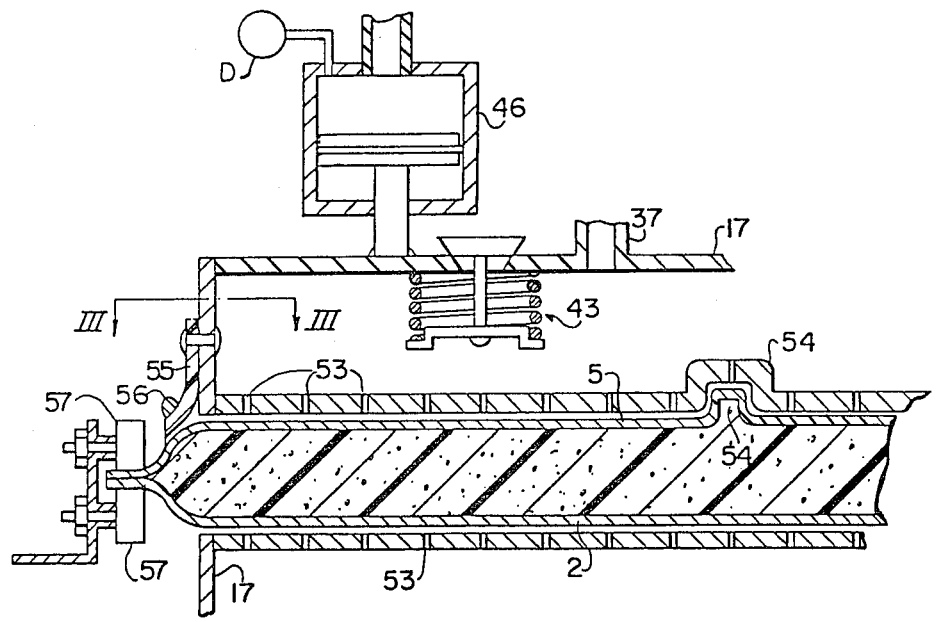
FIG. 2 is a partial cross-sectional view through the apparatus of FIG. 1 and taken on a plane perpendicular to the plane of FIG. 1.
Figure 3:
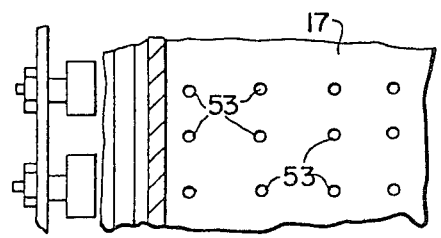
FIG. 3 is a partial cross-sectional view taken along line III—III of FIG. 2.
Figure 4:
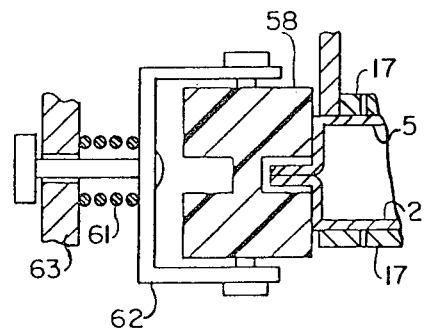
FIG. 4 is a partial cross-sectional view of a portion of FIG. 2 showing an alternative mold side arrangement.

As shown in FIG. 2, the bottom wall of the upper plenum and the upper wall of the lower plenum are each provided with a plurality of holes, which may be uniform bores or configured nozzles, 53 that forms an air bearing for the product as it moves through the mold. The holes or nozzles 53, as shown in FIG. 3, are arranged in a pattern so that adjacent holes are staggered in the direction of product travel, the longitudinal direction. If all of the holes were arranged in a rectangular grid having one direction of the grid parallel to the direction of movement through the mold, the air holes could produce a corrugated effect on the final product, which if desired is sufficient, but which most likely is undesirable. To overcome this when it is undesirable, it is a feature of the present invention to provide at least three and preferable five or more adjacent holes spaced from each other in the longitudinal direction before any two of such nozzles or holes become aligned in the longitudinal direction.

As seen in FIG. 2, the plenum wall may be configured, as at 54, to provide a surface configuration 54' in the final product, for example, a longitudinally extending ridge. It is to be understood that the cross-sectional shape of the plenums is constant throughout the length of the mold, because the process is continuous. While one side of the plenum has been shown, it is understood a similar structure would be provided on the opposite side.

To assist in maintaining the air bearing pressure, it is preferable to employ a resilient strip 55 secured to each side wall of the plenum and extending longitudinally for the full length of the mold. This resilient strip 55 is provided with an inherent bias or as shown a weighted strip or a plurality of weights 56 at its lower edge so as to maintain it in close proximity to the top surface of the product and to confine the air. If desired, a similar strip (not shown) may be provided for the bottom plenum to be spring urged against the product.

As previously mentioned, the glued marginal edges on each side of the bag are squeezed together by means of pinch rollers 57, which are formed in pairs of vertically aligned rollers and which pairs extend along the marginal edges of the mold from adjacent guide roll 7 a distance towards the exit end 49 for a distance at least long enough to bond the edges sufficiently to resist the subsequent foaming pressure. These rollers may be on fixed horizontal axes or spring urged together to clamp there between the marginal edges of the top sheet 5 and bottom sheet 2. If the adhesive is sufficiently strong, only a single set of pinch rolls need be provided only at the entrance end 1 of the mold.

As the bag exits from the pinch rollers where the side edges are bonded together and prior to curing, a plurality of configured rollers 58 having vertical axes extend along the entire remaining sides of the mold so as to form the side of the product into a shape that is more nearly square, and which will need less trimming and wastage of material than if the configuration shown in FIG. 2 were maintained for the final product. The roller 58 is spring urged into the product and plenums as shown by means of a coil compression spring 61 operating between a bracket 62 for the roller axle and a portion 63 of the apparatus frame.

With the present invention, there may be monitoring and control independently at spaced locations along the length of the mold of the air pressure and therefore bearing effect, air temperature and therefore curing effect, air flow and therefore air bearing and surface texture effect, conveying speed and therefore curing time, and plenum support pressure and therefore obstruction and overpressure within the product, for example. Many different effects may be obtained. For example, sudden high pressure pulses may be fed to the plenums to produce dimples in the product at locations corresponding to the air holes in the plenums. The air holes may all be aligned in the longitudinal direction (contrary to the showing in FIG. 3) and an excess air pressure fed so as to produce a corrugated surface on the product.

Preferably, the pressure relief valves will be standard pop valves designed to limit the maximum pressure within the plenums, for example to 10 psi, gauge. Preferable, the pressure within the plenums is maintained between 2 and 10 psi gauge, and most preferably between 3 and 8 psi gauge, with the exact pressure being varied during the process so as to produce the desired effect. It is contemplated that 10 or 20 plenums along the 20 to 100 ft. length of the molding apparatus would be employed, with the length of the plenums toward the entrance end being greater than the lengths of the plenums toward the exit end, but in any event the lengths of the plenums may be varied so as to produce the desired fine control of the above-mentioned parameters where desired. At the entrance end, it would be most desirable to provide very little air pressure, since the foam is expanding at this point, and for the top no air pressure may be needed. Towards the center portion of the apparatus length, the most air pressure would be needed because of the high pressures that may be obtained, for example, 5 psi gauge within the foam when it reaches its full height. It may be desirable to provide the greatest heat toward the exit end, for final curing. It may be necessary to provide the greatest flow of air towards the entrance end, because of large gaps being formed. In any event, it can be seen that the desired characteristics that will be needed vary between products and may be easily obtained with the present apparatus.

The cover sheets 5 and 2 are preferably impervious to the air flow, although they may be slightly porous.

By way of specific examples, the top and bottom cover sheets may be constructed of Kraft paper, metal foil, such as aluminum foil, light cardboard, rolled sheet steel, or rigid synthetic resin sheet material.

The specific foamable chemicals may be beads that when heated will expand to produce rigid bead board, or they may be chemicals that will be mixed so as to chemically react and produce gases to foam the chemicals. By way of example, the final product may be a foamed rigid polyurethane. Materials, solvent and the like are well known in the molding art, and any such materials may be used, for example those disclosed in the prior art relating to continuous molding apparatus.

With some chemicals, relatively low temperatures may be sufficient for the curing and processing within the time limits desired, and the above-mentioned multistage compressor may be used with cooling heat exchange to reduce its output temperature to the desired fixed levels, with the temperature within the various sections being within the range of 160 to 180° F., and such may easily be obtained. With other chemicals, or to obtain faster curing, higher temperatures may be desired. In such cases, the present invention includes the capture of the compressed gases as they escape from the mold and their recirculation into the compressor, so that with a small amount of make-up gases, the output temperature of the compressor may be raised to 300° F. or 350° F.; the high temperature output of the compressor may then be reduced as needed for the individual sections. The exchangers may specifically be water-cooled heat exchangers or air-cooled heat exchangers, so long as they have adjustable controls. If the output of the compressor has a temperature that is too low for a specific section, the heat exchanger may in fact heat the compressor output, for example by means of electric heaters. Preferably, the gas being compressed by the compressor and fed to the air bearings is air, but it is contemplated that other gases may be employed, e.g., nitrogen, or that will chemically react with the product.

The cover sheets are preferably impervious to the air bearing fluid, but they also may be pourous, because they in fact would not transmit the air bearing fluid there through due to the equal pressure of the foaming chemicals. Most likely, the air pressure within the first one or two stages could be completely turned off since the chemicals would be rising and not in need of support, and in fact support may be undesirable. Alternatively, the air pressure within the first few sections may be adjusted to press the rising chemicals before they reach their final height so as to adjust the density of the foam.

The cylinders that raise and lower the top molding surface may be either hydraulic or air, and either single or double acting.

The use of an intermediate sheet material sandwiched within the foam can produce such products as a laminate of paper, polyester foam, paper, urethane foam, and paper, which would have usage as a fire resistant building panel. In such a lamination, it may be possible to eliminate the middle layer of paper if uniform foam layers can be produced. Another example of a laminated product to be produced with the present invention, would be that of a thin layer of polyester fiber glass filtered with an intumescent material, and then covered with a foamed rigid urethane, with a thickness of the intumescent material being adequate to meet fire exposure times established by various codes and other requirements. For fire resistance on both sides of the panels, the polyester and intumescent material may be applied at a mezzanine level above the line and then laid down on top of the foam layer.

The gas supplied in the air bearing would all be exhausted along the sides of the apparatus. Back pressure may be suitably controlled by recirculation of these gases, but if the gases are exhausted directly to the environment, it is then most desirable to employ the above-mentioned side sealing lips to provide sufficient back pressure and to control the exhausting of the gases, particularly to prevent jet grooving along the sides of the material being produced.

In accordance with FIG. 5, the construction of the side closure and the construction of the side sealing for the bag may be varied, but otherwise the construction of the entire apparatus is the same as that previously described. In FIG. 5, a side air plenum 100 is provided with a molding surface 101 having a plurality of holes 102 communicating between the plenum 100 and the interior of the mold so as to support, with an air bearing, the side of the product being formed and to provide for straight side walls and square corners in the product. In the forming of the product, the top cover sheet 5' may be bent with suitable rolls, not shown, but well known in the prior art, so as to form downturned side edges that will overlap with correspondingly bent and downturned side edges of the lower cover sheet 2' along each side edge of the apparatus. These downturned side edges will overlap, as shown, and effectively form a seal where they first meet to prevent the escape of the foaming material within the bag formed by the cover sheets 5' and 2'. As a specific example, the space between the side support surface 103 of the wall forming the plenum 100 and the adjacent surface 104 may be ¼", with the layers of overlapping cover sheets being approximately 3/16", so that the cover sheets will not be clamped and therefore may be free to move longitudinally with the product, while the air escaping through the holes 102 adjacent the overlapped cover sheets will prevent escape of the foam resin. At the top, there will be no space between the surface 103 and the adjacent surface 104. It is also a feature of the present invention that shims may be employed, such as top shim 105 and bottom shim 106. By way of example, these shims may be ½" thick, so that when they are removed, the product will be 1" less in width (shim being employed on both sides of the apparatus). According to this construction, there would be no adhesive between the overlapped portions of the top and bottom cover sheets 5', 2'.

The holes in the plenums used to transmit the air from the platens to the space between the platen and the product to form a thin controlled film of air (with it being understood that other gases may be used), may take on many different actual constructions. In the simpliest form, these holes would be straight uniform diameter bores extending generally perpendicular to the molding surface. Also, these bores may be angled to provide for predominate movement of the air, forward to assist in feeding the product; outward for maintaining the cover sheets tightly stretched, and for other purposes. Also, it is contemplated that specifically shaped nozzles may be employed, for example Coanda nozzles. When used in this environment, such nozzles have the unusual property of providing, in addition to the controlled characteristic air film mentioned above, the characteristic of drawing the cover sheet towards the platen when a spacing between the cover sheet and platen exceeds a fixed amount. This is particularly advantageous with respect to the top cover sheet, because such nozzles may be employed to hold the top cover sheet adjacent to the top platen while the foamable chemicals lie entirely below and out of contact with the top cover sheet as they rise, and thus the rise of the chemicals may be truly a free rise without any hindrance provided by the top cover sheet or air bearing until the chemicals reach almost an entire full rise at which time they will engage the top cover sheet. Such a result has been obtained with actual experimentation. All of the holes may be constructed according to a single construction, or various constructions may be employed for different sections, or each section may employ various nozzle constructions, according to the characteristics desired. Such various constructions, by way of example, for the holes are shown in FIGS. 7 & 8.

Figure 7:
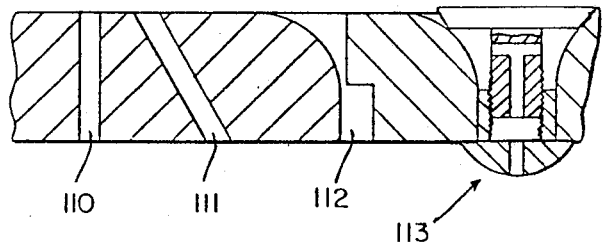
FIG. 7 is an enlarged cross-section of wall.

In FIG. 7, a straight perpendicular hole 110 is shown for a first type of hole; a slanted equal diameter bore is shown at 111 for a second type of hole, a fixed Conada nozzle 112 is shown as a third type of hole, and a variable or adjustable Coanda nozzle 113 is shown as a third type of hole, and other holes or nozzles may be employed. With respect to nozzle 112, the air will exit and generally flow towards the left to provide for the Coanda effect, and the representative cross section is constant throughout the transverse dimension of the nozzle. With respect to the nozzle 113, the entire nozzle is symmetrical with respect to an axis perpendicular to the platen, and is constructed of two members threadably engaged to adjust the outlet aperture; the nozzle may float in the contoured opening in the plenum wall plate, because the exiting air will force the nozzle moveable portions upwardly as shown due to the difference in air pressure. In FIG. 7, air is introduced into the plenum below the holes, and exits upwardly through the holes to form the air film for the support and control of the product.

The principal component in the continuous manufacture of foam resin core panels is a flat fluid film of controlled pressure, temperature and zone location. The shaping of the product, moving of the product and restriction of the growth of the product are all controlled by the process according to the transfer of heat. Control of heat transfer is accomplished by controlling both the volume flow of fluid and its temperature. The progression of the product formation, with respect to foam expansion, completed rise, and degree of curing may be detected according to the measurement of the product's internal pressure, which may be obtained from the cylinder pressure holding the top platen downward at each zone location, or the plenum pressure at each zone, or a combination of these. Both the temperature and pressure are adjustable within each zone to accommodate the process conditions while changes are made elsewhere in the product line to regulate the process.

Due to the use of Coanda nozzles, the top cover sheet may be held closely adjacent the top platent without any other support other than the suction effect of the Coanda nozzles until the foamed chemicals rise up to meet the top sheet, so that the foam rise will be unhibited. Also, the Coanda nozzle may be used to stretch and smooth the top cover sheet or paper transversely, or to give some forward movement to the product or cover sheet to reduce the power requirements for feeding the material.

A considerable amount of water is created during the chemical process, with respect to some foamable chemicals. The moving air film between the product and the platens will carry away such moisture from the product as it is formed.

The fluid film is formed between the upper and lower surface of the product and the rigid platens. The fluid, particularly air, is introduced to the platen surface through one or more perforations in each platen. The air temperature is controlled to suit process requirements. The compressed air enters the perforations from a chamber or channels which are directly opened to the surface via perforations or holes. The air is compressed to a pressure that will produce an air film sufficient in pressure or slightly higher in pressure than the internal product pressure, so as to provide an air bearing support within the desired zone, which pressures will vary from zone to zone due to the degree of rise, foaming or curing. When the process and the air film conditions are in proper balance, the product will flow without friction between the upper and lower platens. In this state, the air film is quite small, for example, 0.010" thick and the product is thereby produced with an extreme accurate thickness, with both external surfaces being smooth and planar. In this frictionless mode, the product can be pulled through the process by light frictional contact with motor driven rolls at the output end of the process line, although other traction means have been considered.

The air film that is in direct contact with the product on both sides permits accurate and direct temperature control, thus improving product quality. Since there is no intervening belt, as in prior art devices, to impede heat flow, or act as a heat sink which transfers heat from zone to zone, the temperature control is immediate and precisely responsive. The present invention also offers the advantage of rapid heat transfer to thus accelerate the process of curing and foaming. This permits higher operating speeds than the prior art, which can be easily accommodated since the frictionless flow of the product offers low limitations to the length of the molding apparatus. Therefore, for the same residence time of the product in the molding apparatus, the speed of the product passing through the molding apparatus can be increased to an extent limited only by the length of the molding apparatus. With respect to prior art rigid-type belt conveyors used to form the molding apparatus, speed is greatly limited with respect to the inertia of the rigid slat (heavy gauge metal) conveyor sections moving through an arc 180° at each end of the apparatus. Also with respect to this type of prior art, changes in speed and therefore accurate control are extremely difficult, again due to the inertia of the apparatus, which is increased proportionate to the length of the apparatus or its width.

To the effect of the present apparatus, the speed can be great as compared to the prior art and the response time for an adjustment of speed to correct for errors and the like or to adjust for variable heating times, are greatly improved due to the absence of any moving parts other than the product itself. Since the product is extremely light (primarily composed of foam resin), there is very little inertia and the product can be started or stopped or changed in speed almost instantaneously. Therefore, changes in the product speed can be very responsive to changed characteristics or conditions within the product itself as determined by the various monitors. Thus, if the internal pressure indicators show that there is an unbalance in the process, corrections can be made by changing the product speed. For example, if curing is not completed or at least not completed to a fixed limit by the time the product reaches a particular zone, the speed of the product moving through such zone may be immediately reduced to bring the process in balance, while other corrections are made such as in the temperature of the air film upstream of such points, and then when the change in temperature of the air film produces a greater curing effect, the speed of the product may again be increased.

Other significant changes can be made in temperature, rate of chemical feed, chemical distribution and chemical proportioning. The product emerging from the apparatus thus may be produced under optimum conditions with respect to foaming, curing, foam density, and the like to result in ideal cell structure, accuracy and uniform density, as well as accuracy in thickness and optical flatness of both surfaces.

A fully cured and stable product will emerge at higher speeds and from a shorter apparatus than previously possible.

Zone control of temperature permits a temperature profile throughout the apparatus, both in the longitudinal direction and the transverse direction, which will accurately match the chemical requirements of the materials being processed. While a change in such conditions longitudinally of the apparatus is obvious, from the foregoing remarks, it may be seen that it is also desirable to zone the temperature pressure transversely of the apparatus, when its width may be 8 to 10 feet, because the heat transfer to the environment may be greater at the edges or they may be like variables. The higher, more efficient heat transfer of the present invention permits the production of materials that have been difficult to produce by other systems with more limited heat transfer methods, for example, ISOCYANURATE. The shortening of the line that is possible with the present invention and the ease with which it can be lengthened by simply adding more platens offers the possibility of a production line built on skids, in a container or on a vehicle incorporating chemical and skin dispensing process controls, and complete wiring and piping so that production can be started with a minimum of set-up and preparation.

In its simpliest form, the platen consists of air boxes, each with a molding surface provided by a plate that is thick enough and provided with enough reinforcement to control deflection within the tolerance limitations of the product to be formed. Ribbing and other reinforcement is preferably constructed internally of each plenum, and the outer surface of the platen is ground to a smooth, flat, accurate finish. Pressurized and heating air is introduced into the box through a properly sized pipe fitting. All surfaces of the box, except the platen surface, are thermally insulated to maintain temperature control and to prevent energy loss.

Three methods have actually been tried for producing the desired air film. One is by perforating the platen with small holes (a successful hole pattern is 0.030" diameter holes on a rectangular grid of 3 inches between holes, with this grid being skewed from the center line of the molding apparatus so that air impinging on the product will not follow a straight line and thereby corrugate the product). A second method is a slot basically along the center line of the molding apparatus, which also can be slightly skewed to protect the product from the formation of corrugation by air impingement. The slot is approximately 0.015" wide. The slot will provide laminar flow of the air film since the air introduced at the center line flows latterally to each edge of the molding apparatus. The third type of nozzles or holes involve the Coanda nozzles. These nozzles can be of circular configuration, for example, nozzle 113 when viewed perpendicular to the molding surface, or a rectangular configuration such as nozzle 112; eperiments show that with such a nozzle construction, air is directed along the surface of the platen to thereby produce a suction somewhat central of the nozzle. This feature will enhance the laminar flow of air as it is introduced from successive rows of nozzles or holes from the center line of the molding apparatus outwardly towards the sides.

In many of the platen designs, arrangements are made to keep the air pressure at at least a minimum value needed to maintain an air film. This is particularly important in the first few platens where the foam exerts little or no pressure and is still quite fragile. The back pressure may be controlled by flaps or recirculation of the gas.

Although the air has been referred to as heated air, new forms of synthetic resin foam may require the use of cold air in one zone or more than one zone, for cooling purposes.

The platen structure, in both depth and wall thickness, is such that it will maintain reasonable flatness while controlling internal product pressure up to 5 psi (such should have the capability of resisting 10 psi, as some chemicals will produce higher pressure than others) for urethane. Experiments show that the film pressure is a fraction of the air pressure within the plenum. Since the ratio between the film pressure and the plenum pressure is a fixed ratio for any specific set of conditions, the film pressure may be calculated from a measurement of the plenum pressure, to maintain a frictionless air film. This film pressure is an indication of the internal pressure within the product and can be used, with suitable multiplying ratios, as an indication of the condition of the chemicals, with respect to their rise or curing, for example, and therefore used to monitor the process and to produce monitoring values that may be compared electronically by conventional control equipment to fixed desired values for adjusting, in a preferred order, other factors such as speed, temperature and pressure. Also, it is possible to employ transducers extending through the platen surface opening directly to the air film, so that the air film pressure may be measured directly.

To further enhance the capability of the molding apparatus and to report the conditions, the platens are divided into zones. Each of these zones has its own pressure and temperature characteristics. The platen which forms one of the walls of the molding apparatus can be zoned by the introduction of lateral bulkhead walls inside of the chamber to form the individual plenums and additional with provision of separate air enough for each such plenum. Another method is to produce the platens in separate sections that may thereafter be bolted or otherwise held together. This latter method has the advantage of easier production and handling in addition to the flexibility afforded by adding or subtracting platens to suit resident time requirements or molding length requirements. A desirable assembly of platens is achieved by mounting the lower run of platens on a frame using shims, wedges or adjusting screws to achieve an accurate level assembly from one end of the appartus to the other. While vertically aligned zones should normally be treated the same, there will be some differences with respect to the weight of the product, that will have to be adjusted for, for instance, by providing a suitable throttle for the common air supply to, for example, the top one of the aligned plenums. Also, there should be some separate adjustment for the air characteristics being supplied to the molding apparatus sides as compared to the immediately adjacent top and bottom plenums. The upper platen or platens simply rest on accurately machined spacer pads and the clamps are used to hold the upper platen down.

While the present invention has been specifically described with respect to an embodiment employing cylinders for raising the upper platens and lowering them to clamp them or hold them in position, it may be possible to eliminate such provisions and allow the upper platens to merely be clamped in place, and if they need be removed they can be unclamped and disassembled, or if an adjustment need be made in the thickness of the product, shims may be employed in the clamping. Thus, an accurate and fixed relationship between the upper and lower walls of the panels is maintained. The shims employed to change the thickness in panels may be accurately machined shims in fixed increments, for example tenths of an inch and inches, so that they may be added or subtracted between the upper and lower platens to change the thickness of the product being formed. It is also contemplated that the platens may be hinged, so that one end may be unclamped and the platen may be pivoted away for quick removal of the upper platen for inspection, maintenance or cleaning of the apparatus in the event of, for example, an accident. The two vertical walls, or side walls, of the apparatus will be equivalent in width to the thickness of the product, or they may be of a width, as measured in the vertical direction, equal to at least the maximum contemplated thickness of the product to be formed and overlap the top and bottom platens as shown in the drawing so it could be usable with any thickness of product. Also, the side walls could be entirely omitted and no side restraint provided so that merely the bag would retain the foam and thereafter the final product could be trimmed along its sides if desired. Also, it is contemplated that the side walls should be provided by members fixedly secured to either the upper or lower platens or to the machine frame.

Among the many variables that significantly affect product quality and production rate are the ratio of chemicals used, their temperatures, the manner in which the chemicals are distributed between skins, the temperature of the skins, the rate of skin movement, the pressures to which the processing materials are subjected, the temperature of the materials during cream, rise, and cure, the accuracy of the restraining or molding surface, the flatness of the surfaces, the absence of relative movement or vibration of these surfaces to prevent disturbing the cell structure, and the length of time allowed for each of the phases of the chemical reaction.

For each product, the higher quality and lowest production cost is achieved by adhering to an optimum set of the above conditions. Beginning with a specific formulation, it is possible to establish a profile of temperature and pressure versus time which represent an ideal processing sequence. This profile can reasonably be duplicated in the present apparatus by varying the air temperature, air flow, product conveying speed, pumping rates and lay down patterns of the chemicals, and air pressure, many of which variables may be varied both longitudinally and transversely of the apparatus. In addition to controlling the temperature and pressure, the profile duplication is further achieved by allotting more or less platens to any particular temperature and pressure zone. When properly reacted according to the optimum conditions, the material will display a predictable profile of internal pressure versus time or distance travelled through the apparatus, since the apparatus is already precalibrated to indicate internal pressure relating to the minimum pressure necessary to maintain a frictionless air film. This measurement of the air plenum pressure can be used to control most of the significant corrections within the apparatus.

The presence of a frictionless air film is detected grossly by the torque needed to move the product through the apparatus. More specifically, the presence of a frictionless air film is detected by the rate of air flow into each plenum, whether these plenums be individual platens or bulkhead separated single platens. When it is found that a frictionless air film no longer exists an immediate correction is made to increase the air pressure (within a safe range) until an overall correction is made in the entire system, which could be a gross correction in correlation to the monitoring of the power needed to pull the product through the molding apparatus. This correction or corrections in any of the factors named above would be decided through a mini-computer or micro-processor programmed with the fixed characteristics of the material being used in the process line, for example, the reaction curve of the chemicals, and fixed ratios between measured quantities and correlated desired quantities. Further, the control could be programmed so as to make changes in the entire process according to a specific preferred sequence under different conditions, and thereby monitor and control chemical temperatures, proportioning ratios, pumping rates of the chemicals, lay down pattern of the chemicals, product speed through the apparatus (not necessarily the same as tractor speed of the pulling mechanism), etc. Should the micro-processor fail to accomplish a correction of the line, the line could be instantaneously stopped with no harm done to any part of the equipment, because of the low inertia. Operating personnel could then examine the product, the chemicals and machinery conditions to determine what adjustments would be needed. Due to the nature of the construction, the molding apparatus therefore offers a more automated approach to panel production with built-in features to assure quality and quantity with a minimum of waste through trial and error, miscalculation or judgment than heretofore possible.

Through experimentation, molding rates of 2 and 3 times the rates normally obtained with existing belt machinery have been obtained with a high accuracy in thickness and density of the product. The density feature is important because the chemicals are expensive and the cost is directly proportional to the density of the material. However, if the density is reduced below the desired standard, then the quality of product is diminished. It is desired to therefore accurately run the apparatus with the minimum density, and to provide for uniform density throughout the thickness of the product.

Since the present design is devoid of moving parts for the apparatus, this permits almost an unlimited width of the panels that can be produced, since it is only a simple structual design to maintain controlled deflection of the platen. With the prior art, the practical limitation of apparatus width was 12', but with the present invention, modules can be laterally stacked to provide greater widths, for example a 20' wide apparatus. Where previously the moving metal belt design presented a tolerance problem in the range of plus or minus 0.090", the present invention can easily maintain tolerances of plus or minus 0.010" for the product. This feature plus the absence of slat marks for rigid slat conveyors makes it very practical to produce extremely thin panels, and by experimentation panels have actually been accurately produced as thin as 3/16".

A number of lay down systems may be employed with the present apparatus, for placing the chemicals, after they are mixed, onto the lower cover sheet. New chemicals may be laid down in a single puddle, a zigzag ribbon, a stationary fan spray, or in a reciprocating spray. All of these systems are compatible with the present apparatus. Further, the chemicals may be laid down in a froth after they have been partially expanded. One machine may be equipped with a dispensed station mounted with wheels running on two tracks to permit the station to be located at any desired distance from the entrance to the apparatus, which distance may be adjusted to provide for a further control in the final product. Further, a spreading roll or doctor blade may be provided between the chemical laid down and the entrance to the molding apparatus; such a roller or doctor is conventional, and will meter the thickness of the liquid film passing through it and thus spreading out any irregularities in the liquid laid down.

The present apparatus may include a rise control rib, that is a flexible slat supported horizontally, adjacent and downstream of the dispense or lay down station for the chemicals, which is then allowed to drape down on top of the upper surface of the foamable chemicals. Such a rib would be very light in weight, and the top surface of the flap would be ribbed laterally using hollow plastic tubing to maintain lateral stiffness without reducing the flexibility along the center line dimension. Such a system might improve the cream and early rise of the foamable chemicals and would take the place of the first set of platens where air jet damage to the foam is critical. Alternatively, Coanda nozzles could be employed for the first few platens during the critical rise stage so as to maintain the cover sheet sucked up against the top platen and away from the rising chemical, and in turn to maintain the pressurized air away from the rising chemical by recirculation to assist the unhibited rise of the chemicals up to the positioning of the top cover sheet that would be close to the final rise height.

The fluid that is used to form the film bearing may also be a reactant with the product, that is it may enter into a chemical reaction with the contacted portions of the product. For Example, in forming a synthetic foamed resin sheet, the fluid inherently or by means of a carried substance or chemical may react with the outer surface of the product to produce a particularly hard skin, and in such case a cover sheet would of course not be used between the product and the wall forming the plenum chambers In such cases, and in others, it would be particularly desirable to recirculate the fluid to recover the unused chemicals. Also, recirculation is advantageous so that impurities in the fluid may be removed, for example, if the fluid is removing moisture formed by the product reacting, the mositure may be removed in a dehumidifier prior to the fluid being recirculated. The fluid film could be that of air, vapor, liquid, steam, carbon dioxide, neon, alcohol, each of which could be a reactant or hot or cold with respect to the material treated.

The various characteristics of the fluid film, for example, temperature, pressure, flow rate, chemical content, pulsations, or the like may be varied from section to section both longitudinally of the apparatus and transversely of the apparatus, so that adjacent sections may have entirely different fluid characteristics.

In the present specification, the wall or plate between the plenum chamber and the process area of apparatus has been characterized as having holes, with such holes having specific embodiments as described above. This terminology is to include the structures that may be variously characterized as porous, or otherwise capable of passing fluid through them so as to form the fluid film on the processing or mold surfaces. Such porosity may be obtained with a felted metal sheet or a sintered metal sheet.

With respect to controlling temperature of the product as it passes through the apparatus, the fluid film is a very effective means of controlling heat transfer, particularly if there is no intervening cover sheet or the like structure between the fluid film and the product. Therefore, higher temperatures may be obtained on the product surface, heat transfer is improved due to the convection caused by the product moving relative to the fluid film, more accurate temperature control is obtained because of the direct contact or near direct contact with a thin cover sheet, it is easier to change the temperature of the product, because there is no thermal inertial of any intervening rigid metal belts, thick belts, or the like and if a cover sheet is used, it would be quite thin and have very small thermal inertia. As mentioned above, the temperature of the fluid film may vary in various zones or sections both transversely and longitudinally along the apparatus. With such a direct heat transfer being so efficient, there is less heat wastage. Further, the power consumed in the apparatus for heating will be quite small when a compressor, particularly a multistage compressor with gas recirculation is used, because in such a case the inherent heating of the fluid during compression may supply all of the necessary heat. Due to the direct contact with relative movement between the fluid film and product, with at most the thin intervening cover sheet, the transfer of heat is very quick to the product when compared with prior art apparatus employing moving conveyors of a belt type.

As a result of the various advantages gained with the present invention, the apparatus may be quite short in length and able to process materials not otherwise capable of economically being processed on a continuous basis.

Another advantage of the present invention over prior belt-type conveyors, is that there are no belt marks to be left on the product. Also, the thickness accuracy is approximately ten times greater than that obtained with belt conveyors.

With the monitoring of the various characteristics of the fluid film and power consumed, a very close, accurate and direct monitoring of the final product is obtained at various points along the apparatus, and on an automated basis the monitor signals can be checked and compared, for example by means of differential amplifiers, with fixed reference signals (which may be manually changed as desired) to obtain differential control signals that are then usable in conventional control apparatus with feed back to actually change the characteristics of the fluid film.

While the preferred embodiment is that of molding a foamed synthetic resin endless web or sheet and carrying it within the apparatus, further uses are contemplated according to the broader aspects in the present invention. A sheet of paper may be formed at the entrance end of the apparatus, dried, coated by means of a liquid carried in the film, have its coating dried, and even polished by the moving film as it passes through the apparatus. While an endless web has been discussed as a product for the present apparatus, according to the broader aspects of the apparatus, an endless conveyor having a form of a ladder with a height less than the spacing between the surfaces of the apparatus may be employed to move separate items to be processed through the apparatus.

While drive pinch rolls have been specifically illustrated for engaging the product at the exit end of the apparatus and pulling the product into the apparatus, it is to be understood that the product may be further moved through the apparatus, when it is an endless web, by frictionally engaging its sides at various points or continuously along the apparatus, by exerting a force in the feed direction through shaped or slanted holes through which the fluid passes, or by using small pinch type rollers along the sides of the apparatus that will engage the sides of the product, for example the overlapping edges of the bag discussed above.

The word "continuous" as used herein, means capability of having a moving line type production with an entrance end and and exit end for the line, but movement of the product or products between such entrance and exit may be discontinuous. For example, the product may be intermittently moved so as to advance from one section corresponding to a section of the plenum chambers or from one zone corresponding to a plurality of such sections or partial sections, to another section or zone respectively, with the residence time in each section or zone determining the amount of processing. Also, with automatic control, the line could be slowed or stopped to gain the desired processing. In addition to this stoppage or slowing down in the line, there may be controlled variations of the fluid flow, temperature, and pressure in addition, or the fluid compression on the product. All of this is usable for either batch operation, or for shortening of the process line. That is, the process line may be shortened by increasing the residence time at the various zones or sections.

With batch operation, one batch may be proecessed when another batch is dispensed, mixed, manipulated, or otherwise pre-processed prior to entering the apparatus of the present invention.

Advantages of the thin fluid processing include the direct control of the fluid film to control the pressure or surface characteristics as they relate to the product, heat exchange, or chemical reaction if the fluid contains a chemical reactant. Movement of the film will correspondingly control speed of such surface processing, heat exchange and chemical reaction.

While recirculation of the fluid has the advantage of conservation of heat, there is the further advantage of conserving the fluid when the fluid is expensive, for example when it might be a gas other than air, such as an inert gas, or when the gas or other fluid includes a catalyst or chemical that enters into reaction with the product which is expensive. With the present apparatus, it is easy to clear or reprocess the fluid for reuse or discharge. It is also easy to change the type of fluid or its temperature, or its flow rate, or its pressure, which contributes to versatility of the apparatus.

According to the present invention, all of the variables are subject to automatic control, which automatic control can be in response to control signals sent to control the variables in a predetermined order of preference or predetermined fixed order, as determined by a comparison of one or more monitor signals with fixed reference signals, which fixed reference signals in turn may be varied manually or automatically to gain different desired characteristics or to accommodate different products and fluid.

The walls on which the fluid film is formed may be rigid or they may be flexible to yield or follow an expanding material such as a free foaming resin while providing some shaping. The wall may be of a porous material such as sintered or expanded metal, or synthetic resin.

As a further variation, the individual plenums may have removable, adjustable legs so that standard units may be connected in series, so that the plenum walls and such legs or other support means would be the frame, or a floor or table could constitute a frame or base.

Instead of being automatic the controls may be manual.

As a specific example of the present invention, the preferred embodiment will be described in detail with respect to the continuous molding of a foamed synthetic resin, which can be skinned or not, laminated or not. Particularly, a polyurethane will be described in this example. In the following profiles of FIG. 8, the length of the apparatus is proportional and may be thought of as from 0 to 100 percent of the length, but the actual length may vary depending upon a great many conditions and may for example be between 40 and 120 feet. Also, when time is shown in the graphs, this too may be thought of in terms of 0 to 100 percent of the total processing time for the materials to travel from the above-mentioned 0 percent length position to the 100 percent length position of the apparatus.

Figure 8A:
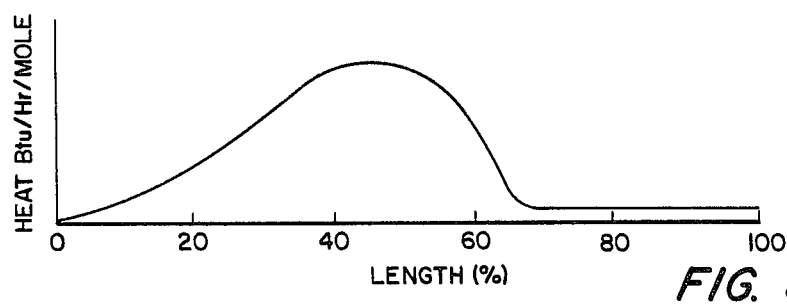
FIGS. 8a through 8c show various reference profile curves and superimposed control values for specific characteristics, by way of example.

As shown in FIG. 8a, the reaction between the NCO containing component and the OH containing component that will react to produce polyurethane is an exothermic reaction, that is one that will create heat. The heat of this exothermic reaction is used particularly to evaporate the volatile blowing agent component, which is uniformly dispersed throughout the mixture of the above-mentioned reactive components. Entrapment and encapsulation of this blowing agent component, with the addition of heat, will produce gas bubbles and create the foaming effect and rise in a known manner. Since foaming agents are well known in this field and may be of many various types, none will be specifically mentioned herein, which is also true of the reactive components. The amount of foaming, or the total foam rise, depends upon the volume attained by the gaseous blowing agent, which in turn, by the laws of perfect gas, depend upon the temperature of the gas, as determined by the available thermal energy of the exothermic reaction, the sum total of energy used by the blowing agent as sensible heat of the liquid, latent heat, sensible heat of the gas, and external addition or subtraction of heat from the environment of the foaming mixture. Other parameters governing the total foam rise are enthalpy of the reactive mixture, and hence the blowing agent, at the start of foaming, efficiency of heat transfer between the rising foam and the environment, temperature and specific heat of the media transferring the environment heat, etc. FIG. 8a is a profile showing the addition of heat to the reactive mixture at any point along the length of the apparatus as caused by the exothermic reaction.

Almost all of the heat added to or taken away from the reactive mixture is controlled by the fluid film and other factors contributing to the environment heat gain or loss are sufficiently negligible in comparison so as to be ignored. The heat transferred by the fluid film will be determined by the temperature of the gas forming the film, the gas velocity (in turn affected by such factors as gas pressure, mixture pressure, friction coefficients, and the like), which are variable, and fixed factors such as coefficient of heat transfer and the specific gas.

As mentioned above, the amount of heat employed in the reactive mixture will determine the foam rate and to some extent the cell structure. This can be determined effectively by measuring the temperature within the reactive mixture, because the characteristics of the reactive mixture are known and fixed. The temperature of the reactive mixture is measured at various locations along the apparatus length and compared with a desired temperature profile shown in FIG. 8b. The deviation of actual temperature from the desired temperature at any particular location, according to the profile and actual measured temperature, can be corrected by determining the fixed amount of heat being added at that location by the exothermic reaction from the profile of FIG. 8a and corrected through variation of fluid film characteristics such as temperature and quantity flow at that specific location. This is possible because of the separate plenums supplying the fluid film independently throughout the length of the apparatus. The control is very quick, because there is no great thermal inertia or heat sink that would be present if the temperature of the mixture were to be controlled through heat being conducted through a metal slat conveyor of the prior art. In contrast, the present invention quickly and accurately controls this heat addition or subtraction by varying the speed of the blower providing the gas for the film to control its quantity or quickly heating or cooling the air through a heat exchanger mentioned above.

Since the exact amount of the reactive chemicals is metered and controlled to the desired level of production, a known amount of molecules of each component, resulting in the known amount of molecules in the resulting polymer (in this example urethane), the thermal energy generated during the exothermic reaction is empirically predicted (and theoretically confirmed, for example 25 kilocalories/mole of urethane at 100 percent conversion). Similar exothermic energy is also available in cases where the isocynate index in excess of 1.00, makes molecules of free NCO available for urethane formation. The total energy thus available would be available to the processing circuitry through the profile of FIG. 8a stored in the memory of the circuitry and the measured quantity of chemicals being supplied as an analog function of the monitored flow rates of the chemicals. Also, the environmental influences would include the moisture content of the gas being supplied as the film, which also may be measured.

The rise in temperature of the reactive mixture and of the rising foam is a function of the total energy generated by the reaction and transferred with respect to the environment. If all of the exothermic energy was the only energy utilized in the process of polymerization and vaporizing blowing agent to obtain foaming, the transfer of heat between the mixture and the environment would be 0, but this too needs control so that the temperature of the fluid film gas is maintained substantially the same as the mixture at all points, that is their profiles would be the same.

Figure 8B:
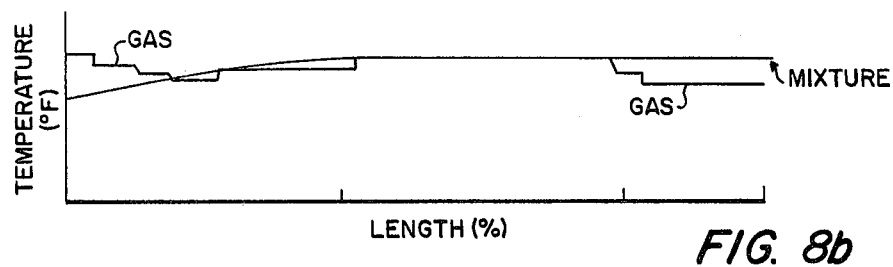

At some points along the production line, it may be desirable to add heat to the reaction, for example to obtain quick expansion of the blowing agent, while at other places it may be desirable to remove heat, for example adjacent the exit end. As shown in FIG. 8b, the temperature of the gas forming the fluid film may be varied to provide the heat input near the entrance and the heat output near the exit, with the stepwise curve being the result of separately and independently controlling the temperature for each plenum chamber serially along the production line. The stepwise curve may approach the desired curve with an increase in the number of plenums. Further, it may be desirable to provide a different temperature profile adjacent the side edges of the web being formed, as compared to the profile in the midportion of the web.

The temperature will also affect other properties of the final product, for example the final foaming height attained, or foam pressures, resultant density, chemical utilization rate, production speed, catalyst level, blowing agent or agent types and amounts, etc. All of these and more monitored entities provide tools for effective feedback and automation using the principles of the profiles and sequencing of various controls to be described later.

In order to illustrate the complexity of the process, it should be noted that the rate of rise of the temperature depends intrinsically upon the rate of formation of the urethane molecules which in turn depends upon the catalyst types and amounts, of which it is customary to use several types. However, the present invention offers an added feature of being able to carry the gaseous catalyst to the fluid film and provide it to the process at desired points along the molding path in desired quantities or even at varying quantities along the flow path. Thus, a curve could be drawn to illustrate the catalyst profile, that is the quantity of catalyst added at different points along the production run. The catalyst would be added by providing it in the fluid film itself. This will affect the rate of heat generated by the exothermic reaction as well as the measurable physical properties of the end product. As mentioned, the rate of heat transfer is greatly affected by the relative velocity of the fluid film with respect to the foaming material it supports, and by the fact that the slightest minute increase in the foaming pressure at any point tends to reduce the thickness of the fluid film, consequently increasing its speed and thereby its heat transfer efficiency locally and also downstream therefrom to a degree. This in turn would call for controlling of the pressure along the length of the molding apparatus to affect the heat added to or taken away from the reactive mixture. The various characteristics, for example temperature, may be controlled in accordance with a profile curve along the length, which as mentioned may vary or be different at different locations transversely of the run and further at different locations vertically of the run, for example with respect to the latter heat may be added to the bottom while removed from the top of the web.

Thus it is seen that controlling the temperature to produce the desired profile can require monitoring and changing of flow rates of reactive components and those of the blowing agent or agents and catalyst, fluid film thickness, speed and temperature of the fluid film, pressures within the reactive mixture and pressure of the fluid film, production speed or speed of the product moving through the molding apparatus, ambient temperature and humidity of the gas forming the fluid film, etc. The accurately controlled temperature profiling and other profiles to be obtained are possible because each of the plenums is independently controlled in this respect and does not move, so that the characteristic at that location may be easily changed or maintained. Further, as mentioned, there is very little inertia with respect to interferring structure, because the gas forming the fluid film directly contacts the product. Direct contact is meant to include the insignificant interpositioning of a release sheet or the like, because such is so thin when compared with prior art heavy metal slat conveyors. While the change in the characteristics according to the profile along the length of the mold do occur in steps due to the separate plenums, it is possible to attain a relatively large number of these steps by creating smaller plenums at locations where a profile is to change rapidly. A large enough number of such steps can closely follow a continuous profile curve that is desired. Desired pressure profiles for both the reaction mixture and the gas of the fluid film may be established. This provides not only accurate and automated process control, but also the conservation of energy used in operating the apparatus and conducting the method. The foaming pressure increases slowly from 0 psig at the point of laying the chemicals down up to a certain maximum value, based upon the amount of overpacking of the chemicals, the degree of completion of urethane reaction, the temperature at the core or in the vicinity of the molecules of the blowing agent, and the level of blowing agent contents, for example. In this particular example, the foaming pressure generated to foam the reactive mixture until it has reached the desired height (thickness of the web, as determined by the mold height), should not be inhibited, that is it is desirable to have the reactive mixture foam as quickly as possible at the entrance and not be pressed down by pressure of a top air film, although a bottom air film is desirable to support the product. Therefore, the pressure profile along the apparatus length can be set to offer nearly 0 pressure in the areas where the foaming mixture has not yet filled the mold.

Figure 8C:
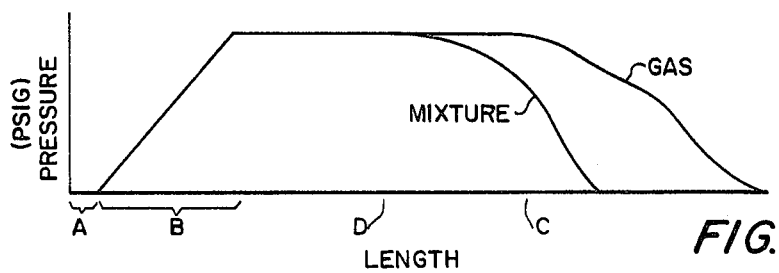
Figure 9:
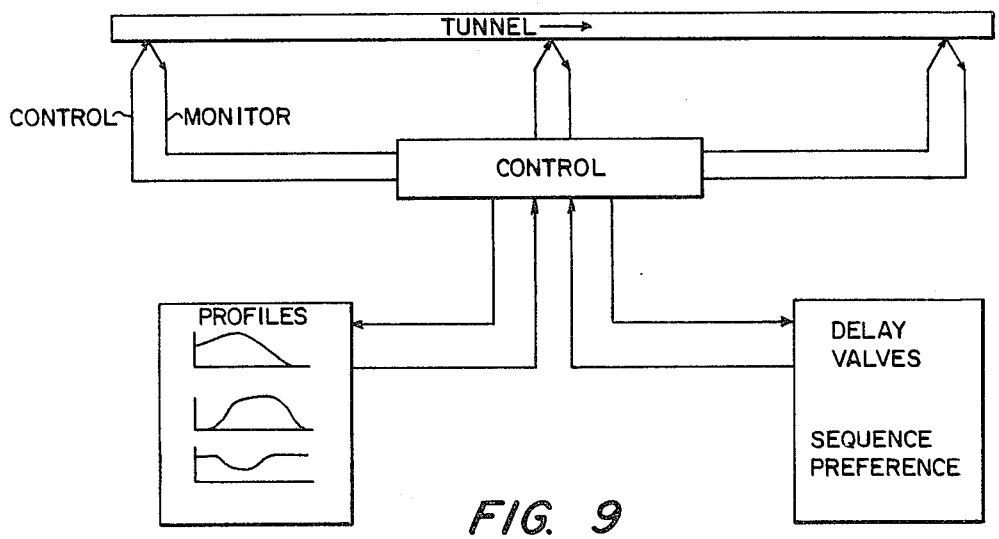
FIG. 9 is a schematic partial electrical control circuit for accomplishing such control.

This provision of substantially 0 pressure, psig, at the entrance is not only an energy conservation feature through reduced consumption of gas, but also a means to achieve a calm environment in which to conduct the reactive mixture during its state of high fluidity and low viscosity. The calm environment in this fluid stage, at the entrance, is a necessity for the preservation of the uniform distribution of the reactive mixture, achieved during its laydown phase. Uncontrolled disturbance of the uniformly distributed mixture leads to a non-uniform thickness-rise, thus resulting in random direction cell orientation due to forced filling of the starved areas, and in localized density or uneven density distribution, as well as in decreased foam yield or increased cost per task: these are the disadvantageous results of providing a pressurized gas or the like above the reactive mixture at the entrance portion of the mold. In FIG. 8c, the area A represents the area of substantially 0 pressure wherein the mixture rises to its full height. The distance traveled B represents that portion of the mold length wherein the reactive mixture has reached its full height, is thereafter restrained in its upper movement, and starts to cure. At a certain stage of polymerization, when the polymer membranes of the foam cell are sufficiently strengthened to be able to contain the pressure of the blowing agent gas encapsulated within the cells, the resultant overall pressure exerted by the risen foam ceases to be exerted on its containment structure, namely the fluid film and plenum chambers. This starts to occur at approximately point D. Thus reduction in the foaming pressure of the reactive mixture itself is a rapidly declining curve as shown. The gas pressure may be maintained much higher up until approximately point C, wherein then it too is reduced. The higher gas pressure will not affect the cell structure, which is sufficiently rigid after point D to maintain this differential in pressure, but the high pressure of the gas is provided to obtain sufficient film fluid flow for other purposes, for example removing moisture, removing heat, etc.

Although the affect of various parameters on the foaming pressure is individually calculatable, the aggregate affect of all of several of them simultaneously or in rapid overlapping succession is best derived accurately through empirical measurements of actual pressures at various junctions and by automatic feedback controls adjusting the pressure in steps to suit the illustrated profile. The present invention includes a self compensating pressure regulation system that can operate independently of actual controlling variables, to maintain the pressure of the fluid film at a level above the actual foaming pressure by a fixed magnitude. This automatic pressure regulation would then provide a continually updated measure of foaming pressure along the tunnel by merely measuring the gas pressure and adding to this the fixed difference provided by the automatic feature. This can be used as an input to the control system to control such characteristics as temperature, flow rates, production line speed, thickness, blowing agent types, blowing agent amounts, and blowing agent temperature. This automatic pressure differential could be provided by measuring the spacing between the plenum and the product, and maintaining it at a fixed spacing, which would then to some degree automatically establish the pressure of the gas at the fixed level above the internal pressure of the foam at least up until the point D.

A typical rise profile readily indicates that the start of the confined or restrained area of the mold, along the production line can be delayed until nearly 99 percent of the thickness setting is attained by the rising foam at the entrance. The actual length of containment, which is a substantial contributor to the initial investment of the plant equipment, that is the length A need only be sufficient to provide the restraint to the rising foam and to hold it under restraint only until the polymer membranes have advanced to a stage where they can be self supporting in this function. In present practice, the exact location of precise 99 percent rise (or even 95 percent rise) as well as membrane self sufficiency are virtually undeterminable with reasonable degree of reliability. This leads to a conservative excess containment margin at the entrance as well as the exit ends, which greatly increase the cost of equipment due to such increased length for a margin of safety. With the present invention, sensors determine these two important points on the foam rise curve, points after length A and point D, by either direct measurement of such items as foam height, and also by calculation or comparisons with stored data as determined by measured variables such as foaming pressure.

Determination of the optimum entrance to the containment zone varies under actual production conditions. The entrance of the containment zone is defined as the entrance of the closed mole portion, that is where the upper plenums are first provided. The longitudinal positioning or point along the length of the apparatus of the mixing head can be adjusted forward and rearward to assure that the entrance to the containment zone always occurs at the optimum point of foam rise. This, in combination with the optimum exit point, would permit a given production line having a fixed containment zone length at a high speed of production, since there would be no unused wasted length at the entrance and exit ends, and there would no longer be a need for required margins of safety to cover possible errors. It is noted that a foaming mixture entering the containment zone too prematurely, that is in advance of the optimum point should be considered a wasteful mutilization of the containment zone. Too late an entrance is, of course, an unacceptable condition usually causing line stoppage because the foam would then be higher than the entrance end of the mold.

In order to make the point at which confinement is no longer necessary correspond with the exit end of the mold confinement area, control of various characteristics may be provided, for example: production line speed, that is withdrawal speed of the product; reaction rate as controlled by catalyst and heat control, and the like. As mentioned above, various characteristics of the process are measured, for example temperature of the fluid film, temperature of the reaction components, pressure within the reaction, pressure within the fluid film, fluid film volume, reactive components volume, etc. These measured values would be either compared directly against set points taken from the above-mentioned profile curves or similar profile curves, or used to derive set points or merely recorded as reference points. Upon deviation of any parameter from its optimum, the amount and rate of such deviation measured and a recommended list of corrective actions may be either automatically undertaken or displayed for operator execution. In either case, there is a preprogrammed time delay after execution of each control, which would be different for each type of control, after which a measurement would again be taken before the next control and the prescribed sequence of controls would be undertaken. This delay is provided so that the effect of the control may be felt upon the product line to determine by the subsequent remeasurement of the characteristic under concern, to determine if further corrective action should be taken. For example, it may be determined from a measurement that the process requiring confinement has been finished at an unacceptably early point prior to the end of the confinement zone. The sequence of steps to be undertaken to correct this would be, for example: (1) increase of production line speed by a fixed amount, for example 2 percent; (2) reduction in catalyst amount by 1 percent; (3) reduction in heat input, with the reduction in heat input being accomplished by the following steps taken in order, namely reduction in gas flow of the fluid film, reduction in fluid film temperature, change in proportion of chemicals used in the reactive mixture, etc. The first change would be made and then a fixed time associated with such change would pass as a delay before another measurement is made to determine if any further corrective action need be taken. If further corrective action is warranted, the second step would be undertaken followed by a delay associated with such second step before another measurement is taken to determine if the corrective action is sufficient. This would continue until the problem was solved. Between corrective steps, it is desirable to check other characteristics to see if they have gone outside of their limits as a result of the corrective action taken. For example, providing additional heat input to the reactive mixture may increase the internal pressure of the reactive mixture to a point where the fluid film thickness becomes too small, resulting in a branch control to increase the fluid film thickness by increasing the pressure of the gas within the fluid film. In this manner, the characteristics are interrelated as are the controls.

While fixed values or reference values, such as profiles are discussed, it is understood that these may be changed to produce different characteristics as desired, but in general with respect to operation of the system over a finite period of time or for a finite quantity of product, they would remain fixed.

Additional profiles may be established, such as a curve of percent cure versus apparatus length; percent rise versus apparatus length; catalyst quantity versus reaction time; reactive mixture ratio versus reaction time; residence time versus product speed through the mold.

The exact curves, curve shapes, curves needed, and the like as well as the characteristics to be measured and controlled, as well as the order of control, as well as the branching mentioned above are all determined by the nature of the product being produced and the characteristics of the product. Even with polyurethane, one run may require a very low density, while another run requires a high density, while a still further run requires surface treatment to produce a skinning effect, which can be provided by chemicals added to the system midway along the production run by being supplied to the gas forming the air film.

While a preferred embodiment has been set forth for purposes of illustration, with variations and modifications, other embodiments, modifications and variations are contemplated according to the broader aspects of the present invention, all as determined by the spirit and scope of the following claims.

It is claimed:

1. Apparatus for continuously processing an endless web moving in the longitudinal direction of the web comprising:

a base;
a first, generally planar, normally stationary, process surface mounted on said base;
a second, generally planar normally stationary, process surface mounted on said base to be spaced from and parallel to said first process surface;
each of said first and second process surfaces being composed of a plurality of sections serially arranged in longitudinal direction of the apparatus corresponding to the processing direction with an entrance end and an exit end for the web;
a plurality of holes extending over substantially the entire first and second process surfaces in a fixed pattern;
means operatively associated with said process surfaces forming a separate plenum chamber for each of said surface sections on the side of each of said surfaces opposite from the other surface so that all of said holes within each surface section open up into their corresponding plenum chamber;
means operatively associated with said plenum chambers for supplying pressurized fluid separately to each of said plenum chambers so that the fluid will exit from said holes and form fluid films respectively along said process surfaces sufficient to form an anti-friction fluid bearing for the web;
side supports closing the side space between each longitudinal side of the first and second process surfaces to form therewith a generally four-sided closed stationary tube extending for substantially the full longitudinal length of the apparatus and being open at opposed entrance and exit ends;
feeding means operatively associated with said process surfaces for engaging the endless web and for continuously moving the web through the apparatus;
means operatively associated with said process surfaces for depositing foamable chemicals at said entrance end of the apparatus to produce a continuous web of synthetic foam;
means operatively associated with said apparatus for separately monitoring a physical characteristic of the fluid for each surface section and providing a correlated monitor signal;
central monitor and control means operatively associated with said apparatus for receiving all of said monitor signals, comparing said monitor signals respectively to separate fixed reference signals of a stored profile of reference characteristic value versus longitudinal length and producing respective control signals correlated to the comparison for each monitor location;
a plurality of separate means operatively associated with each of said plenum chambers for controlling the characteristic of the fluid being supplied to its plenum chamber in accordance with a temperature control signal; and
said control means operating said separate means in a fixed sequential order only so long as said comparison signal is different than a fixed value as determined after a delay correlated to each operation of the sequence.

2. A method of processing a product with a fluid film, comprising the steps of:
providing a fluid under pressure;
providing a product to be processed by the fluid;
providing a confining wall having a general shape of the final desired shape of the product on one side;

passing the fluid through the confining wall to form a thin film fluid processing the bearing film on said one side of said confining wall;

controlling the characteristics of the fluid;

directly contacting the thin fluid film with the product immediately adjacent said confining wall to prevent direct contact between said product and said confining wall and further to directly process the product according to the controlled characteristics of the fluid;

wherein said step of providing a product provides chemicals, mixes them and deposits them at an entrance end of said confining wall, moves said chemicals in a conveying direction to a first section of said confining wall from said entrance end so that they will rise and attain a fixed final height of synthetic foam resin, conveying said foam resin from said first section through a second section of said confining wall and processing said resin in said second section to a substantially rigid product, and conveying said substantially rigid foam product to an exit end of said confining wall to complete the curing of said resin so as to produce an indefinite length continuous web of rigid synthetic polyurethane foam resin;

monitoring the quantity of mixed chemicals deposited on said confining wall at the entrance end and producing a correlated signal;

monitoring the proportion of mixed chemicals deposited at said entrance end and producing a correlated signal;

monitoring the flow of fluid within said thin film and producing a correlated signal;

conducting at least some of said steps of monitoring and producing at spaced intervals along the conveying direction and length of said confining wall and at spaced intervals transverse to said conveying direction;

maintaining a profile curve of fixed reference characteristic versus confining wall length for each important physical characteristic of said fluid and said chemicals;

separately comparing said signals with respective fixed reference signals obtained from said profiles correlated to the monitored characteristic and its position of monitoring to produce corresponding differential error signals; and controlling said characteristics of chemical proportions, chemical quantities, fluid flow, fluid temperature, each in accordance with one or more of said reference error signals, in a fixed order of preference so as to maintain the fluid and chemical characteristics within fixed deviation from said profiles.

3. A method of processing a product with a fluid film, comprising the steps of:

providing a fluid under pressure;

providing a product to be processed by the fluid;

providing a confining wall having a general shape of the final desired product on one side;

passing the fluid through the confining wall to form a thin film fluid processing and bearing film on said one side of said confining wall;

controlling the characteristics of the fluid;

directly contacting the thin fluid film with the product immediately adjacent said confining wall to prevent direct contact between said product and said confining wall and further to directly process the product according to the controlled characteristics of the fluid;

monitoring the pressure of the fluid film and producing a corresponding pressure monitor signal;

providing a fixed reference profile curve of fluid pressure versus confining wall length;

comparing the pressure reference signal obtained from said profile corresponding to the monitoring location with the pressure monitor signal and producing a correlated differential pressure signal; and automatically varying the pressure of the fluid film in correlation to said pressure differential signal.

4. A method of processing a product with a fluid film, comprising the steps of:

providing a fluid under pressure;

providing a product to be processed by the fluid;

providing a confining wall having a general shape of the final desired shape of the product on one side;

passing the fluid through the confining wall to form a thin film fluid processing and bearing film on said one side of said confining wall;

controlling the characteristics of the fluid;

directly contacting the thin fluid film with the product immediately adjacent said confining wall to prevent direct contact between said product and said confining wall and further to directly process the product according to the controlled characteristics of the fluid;

monitoring the temperature of the fluid film and producing a corresponding temperature monitor signal;

providing a fixed reference profile curve of fluid temperature versus confining wall length;

comparing the temperature reference signal obtained from said profile corresponding to the monitoring location with the temperature monitor signal and producing a correlated differential temperature signal; and automatically varying the temperature of the fluid film in correlation to said temperature differential signal.

5. A method of processing a product with a fluid film, comprising the steps of:

providing a fluid under pressure;

providing a product to be processed by the fluid;

providing a confining wall having a general shape of the final desired shape of the product on one side;

passing the fluid through the confining wall to form a thin film fluid processing and bearing film on said one side of said confining wall;

controlling the characteristics of the fluid;

directly contacting the thin fluid film with the product immediately adjacent said confining wall to prevent direct contact between said product and said confining wall and further to directly process the product according to the controlled characteristics of the fluid;

monitoring the fluid flow of the fluid film and producing a corresponding flow monitor signal;

providing a fixed reference profile curve of fluid flow versus confining wall length;

comparing the fluid flow reference signal obtained from said profile corresponding to the monitoring location with the fluid flow monitor signal and producing a correlated differential fluid flow signal; and automatically varying the fluid flow of the fluid film in correlation to said fluid flow differential signal.

6. A method of continuously molding an indefinite length of web of synthetic resin foam products with a fluid film, comprising the steps of:

providing a fluid under pressure;

forming a tubular tunnel open at opposite entrance and exit ends by providing interconnected bottom, top and opposed side confining walls, with said tunnel generally having the cross sectional shape of the product;

passing the fluids through the confining walls to form a thin film fluid processing and bearing film envelope along the entire tunnel;

providing at least two separate chemicals that when mixed will react to foam and produce a synthetic resin foam;

mixing and depositing said chemicals on said bottom wall adjacent said entrance open end of said tunnel to be supported and evenly distributed in the transverse direction, with respect to the conveying direction, by said fluid film to form the beginning of the indefinite length web;

moving said chemicals as a web in a conveying direction parallel to the length of said tunnel through a first section of said tunnel from said entrance end while said chemicals rise and attain a fixed final height of synthetic foam resin that is substantially fills the cross section of said tunnel at the end of said first section;

conveying said foam resin web from said first section through a second section of said tunnel while controlling the temperature of said resin in said second section by controlling the temperature of said fluid to cure said resin into a substantially cured foam web to produce an indefinite length continuous web of cured synthetic foam resin;

providing separate pressure, temperature and fluid flow versus tunnel length profiles that are fixed references;

montoring the pressure, temperature and fluid flow at a plurality of fixed locations along the tunnel length and comparing monitored values with values taken from the respective profiles at respective locations and producing deviation control signals;

controlling the characteristics of pressure, temperature and quantity of fluid in said film in a fixed sequence with a fixed delay in the sequencing, in accordance with said deviation signals; and completely enveloping the web throughout said tunnel with the thin fluid film to prevent contact between said web and said confining walls, and further to process the resin according to the controlled characteristics of the fluid.

7. The method of claim 6, including the further steps of:

monitoring the quantity of mixed chemicals deposited at the entrance end and producing a correlated signal;

monitoring the proportion of mixed chemicals deposited at said entrance end and producing a correlated signal;

monitoring the linear speed with which said web exits from said exit end of said tunnel and producing a correlated signal;

providing fixed referenace profiles separately of quantity of mixed chemicals, proportion of mixed chemicals, and linear speed versus tunnel length, and comparing monitored values at fixed locations along said length with corresponding reference values taken from said profiles at the same locations to produce correlated deviation signals;

controlling the characteristics of chemical proportions, chemical quantities, fluid flow, linear web speed exiting from said tunnel, and fluid temperature in accordance with said deviation signals in a fixed sequencing of controlling with a fixed delay between controlling steps.

* * * * *